United States Patent
Dooley

(10) Patent No.: US 10,389,732 B1
(45) Date of Patent: *Aug. 20, 2019

(54) SECURE DATA VERIFICATION TECHNIQUE

(71) Applicant: Daniel A Dooley, Hull, GA (US)

(72) Inventor: Daniel A Dooley, Hull, GA (US)

( * ) Notice: Subject to any disclaimer, the term of this patent is extended or adjusted under 35 U.S.C. 154(b) by 393 days.

This patent is subject to a terminal disclaimer.

(21) Appl. No.: 15/411,265

(22) Filed: Jan. 20, 2017

Related U.S. Application Data

(63) Continuation of application No. 14/075,471, filed on Nov. 8, 2013, now Pat. No. 9,577,986, which is a continuation-in-part of application No. 13/751,320, filed on Jan. 28, 2013, now Pat. No. 9,202,174, which is a continuation-in-part of application No. 13/560,528, filed on Jul. 27, 2012, now Pat. No. 9,378,026, said application No. 14/075,471 is a continuation-in-part of application No. 13/874,476, filed on Apr. 30, 2013, now Pat. No. 9,544,284, which is a continuation-in-part of application No. 13/560,528, filed on Jul. 27, 2012, now Pat. No. 9,378,026.

(51) Int. Cl.
  *H04L 29/06* (2006.01)

(52) U.S. Cl.
  CPC .......... *H04L 63/12* (2013.01); *H04L 63/0428* (2013.01)

(58) Field of Classification Search
  CPC ............................ H04L 63/12; H04L 63/0428
  USPC ...................................................... 713/150
  See application file for complete search history.

(56) References Cited

U.S. PATENT DOCUMENTS

| | | | | |
|---|---|---|---|---|
| 7,080,252 | B2 * | 7/2006 | Marukawa | ............ H04L 9/3247 235/375 |
| 7,260,555 | B2 * | 8/2007 | Rossmann | .......... G06F 21/6209 705/50 |
| 8,381,287 | B2 * | 2/2013 | Trotter | .................... H04L 63/08 726/4 |
| 8,990,896 | B2 * | 3/2015 | Veeraraghavan | ....... H04L 63/08 726/4 |

(Continued)

OTHER PUBLICATIONS

LifeSocial.KOM: A secure and P2P-based solution for online social networks (Year: 2011).*

(Continued)

*Primary Examiner* — Taghi T Arani
*Assistant Examiner* — Badri N Champakesan
(74) *Attorney, Agent, or Firm* — Gregory Scott Smith; Carlo Julio Salas Martinez; Smith Tempel Blaha LLC

(57) ABSTRACT

A technique for the secure exchange and verification of data between multiple entities that use compatible business management systems utilizes serializable data transfer objects to transfer business data over a secure communication path. A conversion algorithm transforms a subset of the business data contained within the transfer objects, and the resulting data string is compared to data strings from other objects that are related to the transaction and which were transformed by the same conversion algorithm. If the data strings are not identical, a discrepancy exists. Serializable objects link all data objects relating to a given business transaction. An interface allows users to view and manage data contained in data objects, including discrepancies between compared objects.

12 Claims, 10 Drawing Sheets

(56) References Cited

U.S. PATENT DOCUMENTS

| | | | | |
|---|---|---|---|---|
| 2004/0083390 A1* | 4/2004 | Cuenod | .............. | H04L 63/0428 726/10 |
| 2006/0107062 A1* | 5/2006 | Fauthoux | ................ | G06F 21/34 713/182 |
| 2007/0180519 A1* | 8/2007 | Boccon-Gibod | ....... | G06F 21/10 726/21 |
| 2009/0288012 A1* | 11/2009 | Hertel | .................... | G06Q 20/02 715/738 |
| 2012/0290842 A1* | 11/2012 | Artishdad | ........... | H04L 63/0428 713/168 |
| 2014/0143831 A1* | 5/2014 | Fieweger | .............. | H04L 9/3231 726/3 |
| 2014/0304505 A1* | 10/2014 | Dawson | .............. | G06F 21/6227 713/165 |
| 2014/0359276 A1* | 12/2014 | Resch | ................. | H04L 63/0457 713/153 |

OTHER PUBLICATIONS

Secure Mediation Gateway architecture enabling the communication among Critical Infrastructures (Year: 2010).*

* cited by examiner

SECURE DATA VERIFICATION TECHNIQUE

CROSS-REFERENCE TO RELATED APPLICATIONS

This is a utility patent application being filed in the United States Patent and Trademark Office as a non-provisional application for patent under Title 35 U.S.C. § 100 et seq. and 37 C.F.R. § 1.53(b) and, is a continuation of co-pending U.S. patent application Ser. No. 14/075,471 that was filed on Nov. 8, 2013, which is a continuation-in-part of the U.S. patent application Ser. No. 13/751,320 that was filed on Jan. 28, 2013 with U.S. Pat. No. 9,202,174 that was issued Dec. 1, 2015, and which is a continuation-in-part of the U.S. patent application Ser. No. 13/874,476 that was filed on Apr. 30, 2013 with U.S. Pat. No. 9,544,284 that was issued Jan. 1, 2017, both of which being a continuation-in-parts of the U.S. patent application Ser. No. 13/560,528 that was filed on Jul. 27, 2012 with U.S. Pat. No. 9,378,026 that was issued Jun. 28, 2016. Each of these applications reincorporated herein by reference in their entirety.

BACKGROUND

Since small businesses often manually enter data into their business management systems, the potential for inaccurate information in transaction records is always present. Small errors like mistakes in keying in a quantity or transposing two characters of an item number can quickly become expensive problems if left undetected. Companies that use the same business management platform are by no means immune from inaccuracies, especially if they have to manually enter data into their respective systems.

The ability to verify that a customer or supplier has ordered the correct items, sent all or part of a shipment, or has paid an invoice on time can help small businesses reduce errors and run more profitably.

There is a need to facilitate the secure exchange and verification of electronic data between businesses that have compatible business management systems.

BRIEF SUMMARY

The present disclosure presents a novel technique for securely exchanging and verifying electronic data between multiple entities that share a common accounting link and that utilize the same business management system, without compromising access to confidential or otherwise unauthorized data of any of the entities. In general, the technique utilizes serializable data transfer objects, conversion algorithms, and comparison functions. The serializable data transfer objects are used to share business data over a secure communication path, eliminating the need for an active user connection between entities wishing to exchange and verify data. A conversion algorithm transforms a subset of the business data contained within the transfer objects into a data string that is compared to data strings from other objects related to the transaction that were transformed by the same conversion algorithm. If the data strings are not identical, a discrepancy exists. The transfer objects relating to a given business transaction are linked by a serializable data transfer object dedicated to the transaction. Security of business data between the participating entities is maintained both because there is no remote user connection between any of the participating entities, and because the participating entities have the option of accepting or not accepting the data being exchanged into their business management systems. In addition, a comprehensive audit trail of records relating to the transaction is created.

The secure data verification technique can be utilized in a variety of business settings and computing environments. As a non-limiting example, it can be part of a web-based or web-centric accounting and general ledger system in a client-server configuration. One implementation of the technique contains a user interface in the client module that sends information to the server and receives information requests from the server, and a server module that receives information requests from the client and sends information to the client. A portion of the data relating to a business transaction to be verified is captured from the transaction record, which remains intact and in its original state. A subset of the captured data is copied and transformed into a fixed-size string of data via a conversion algorithm. The captured data and the data string created by the conversion algorithm are then encapsulated into a serializable data transfer object. The transfer object is then linked to another serializable transfer object that links all the transfer objects relating to the transaction. These objects are then transmitted over a secure communication path to the other participating entity or entities. The data strings contained in the transfer objects can be compared to data strings from other transfer objects that are related to the transaction and transformed by the same conversion algorithm. If the data strings are not identical, a discrepancy exists between the transaction records associated with the transfer objects being compared. Transfer objects can be accessed by any of the entities participating in the transaction, regardless of which entity created them, but associated transaction records can only be accessed by their originating entities.

It will be appreciated that the method captures values from a predetermined set of fields that are common to transaction records corresponding to business activity between participating entities. Non-limiting examples of such common fields can be those that contain information regarding items or services, vendors, customers, dates, quantities, amounts, or other fields agreed upon by the participating entities. Similarly, it will be appreciated that the subset of captured data transformed by the conversion algorithm can comprise values from a predetermined set of fields that can indicate meaningful differences between transaction records if those fields in said records contain values that are not identical. Non-limiting examples of such fields can be those specifying amounts, quantities, or other fields agreed upon by the participating entities.

In general, embodiments of the secure data verification technique operate to exchange business data related to a given transaction between participating entities by using data transfer objects, conversion algorithms, and comparison functions to exchange and verify the data contained in the business records of each participating entity.

These embodiments, features, and aspects are further described in the following detailed description and the figures.

DETAILED DESCRIPTION OF EMBODIMENTS OF THE INVENTION

This description is related to and is directed towards a technique to provide for the secure exchange and verification of electronic data between multiple entities that use the same business management system and that have a common accounting link. The various embodiments of the secure data verification technique described herein utilize the non-limiting example of a business transaction conducted between two participating entities—Company A and Company B. Company A orders widgets from Company B, which establishes their common accounting link. Both companies use the same business management system and have agreed to use the technique to exchange and verify data with each other relevant to their business transactions. It should be understood that the reference of "the same business management system" may include a single shared system, however, the term is not limited to such a configuration and in fact may include multiple and distributed systems that are running or implementing a compatible business management system. The compatibility may include running identical software applications, containing identical hardware, including capabilities to communicate over a common protocol, sharing file databases, and/or the like as a few non-limiting examples. In general, each such business management system is capable of establishing a secure communication path, such as by utilizing HTTPS and a public/private encryption key system as a non-limiting example, which will provide encrypted communication and secure identification of a network web server.

Figure 1:
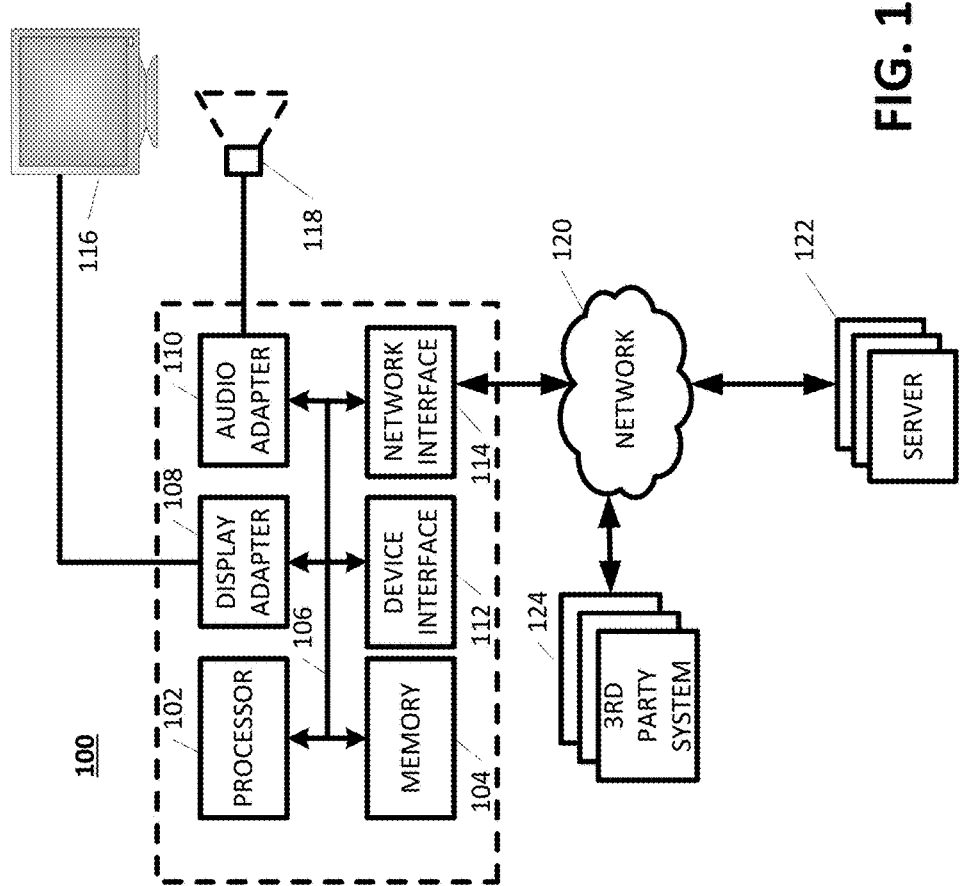
FIG. 1 is a functional block diagram of the components of an exemplary environment or platform in which the secure data verification technique can be implemented or an application, module or routine utilizing the secure data verification technique can be implemented.

FIG. 1 is a functional block diagram of the components of an exemplary environment or platform in which various embodiments of the secure data transfer technique can be implemented, or an application, module, component or routine utilizing the technique can be implemented. It will be appreciated that not all of the components illustrated in FIG. 1 are required in all embodiments or implementations of the technique, but each of the components are presented and described in conjunction with FIG. 1 to provide a complete and overall understanding of the components. In addition, it will be appreciated that the embodiments of the technique may be implemented in systems and/or environments that may include other components and functionality and as such, the illustrated configuration is simply a non-limiting example.

The exemplary platform 100 is illustrated as including a processor 102 and a memory element 104. In some embodiments, the processor 102 and the memory element 104 may be communicatively coupled over a bus or similar interface 106. In other embodiments, the processor 102 and the memory element 104 may be fully or partially integrated with each other. The processor 102 can be a variety of processor types including microprocessors, micro-controllers, programmable arrays, custom IC's etc., and may also include single or multiple processors with or without accelerators or the like. The memory element of 104 may include a variety of structures, including but not limited to RAM, ROM, magnetic media, optical media, bubble memory, FLASH memory, EPROM, EEPROM, etc. In addition, rather than being internal to the platform 100, the memory element 104 may be external to the platform 100 and accessed through a device interface 112 or network interface 114. The processor 102, or other components may also provide sub-components or functionality such as a real-time clock, analog to digital convertor, digital to analog convertor, sensors, etc. The processor 102 also interfaces to a variety of elements including a control/device interface 112, a display adapter 108, audio adapter 110 and a network/device interface 114. The control/device interface 112 provides an interface to external devices, systems, equipment, sensor, actuators or the like. As non-limiting examples, the control/device interface 112 can be used to interface with devices or systems such as a keyboard, a mouse, a pin pad, and audio activate device, a PS3 or other game controller, as well as a variety of the many other available input and output devices or, another computer or processing device. The display adapter 108 can be used to drive a variety of visually oriented elements 116, such as display devices including an LED display, LCD display, one or more LEDs or other display devices, printers, etc. The audio adapter 110 interfaces to and drives a variety of audible or other alert elements 118, such as a speaker, a speaker system, buzzer, bell, vibrator, etc. The network/device interface 114 can also be used to interface the computing platform 100 to other devices or systems through a network 120. The network may be a local network, a wide area network, wireless network (WIFI, Bluetooth, cellular, 3G, etc.), a global network such as the Internet, or any of a variety of other configurations including hybrids, etc. The network/device interface 114 may be a wired interface or a wireless interface. The computing platform 100 is shown as interfacing to a server 122 and a third party system 124 through the network 120. Thus, the computing platform can function independently, in connection with one or more systems, or even as a distributed system. A battery or power source provides power for the computing platform 100.

Figure 2:
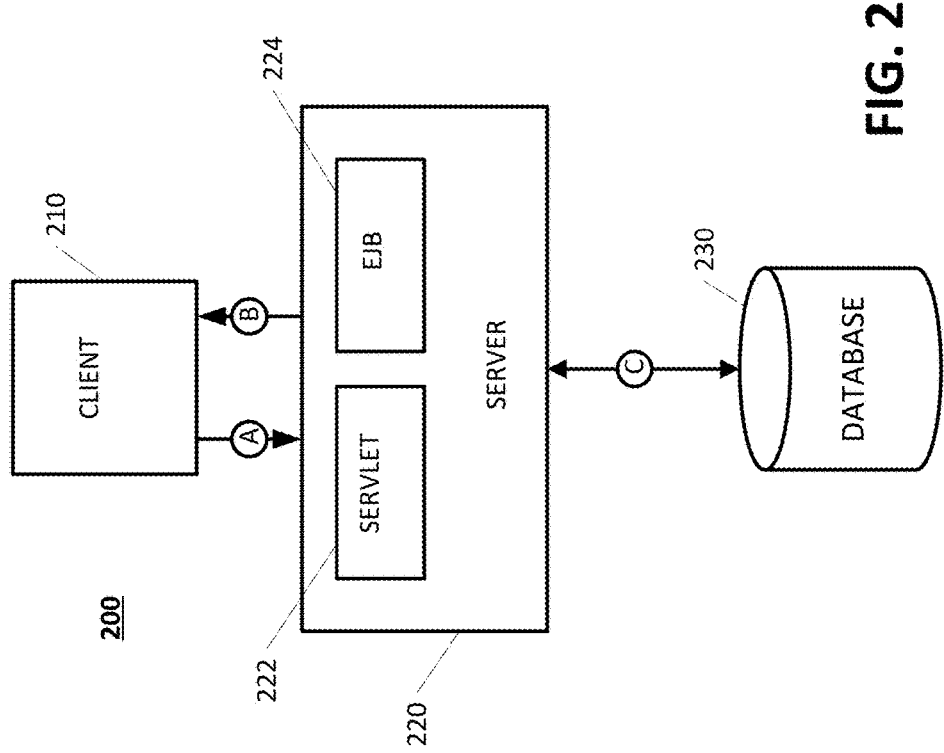
FIG. 2 is a functional block diagram illustrating non-limiting example of a functional environment in which the secure data verification technique can be implemented.

FIG. 2 is a functional block diagram illustrating non-limiting example of a functional environment in which the secure data verification technique can be implemented.

Thus, although the various functions are illustrated as being divided into various blocks, it will be appreciated that some of the functions may be implemented within common hardware, firmware and/or software components and/or various functions may actually exist among two or more separate hardware, firmware and/or software components. The environment illustrated in FIG. 2 is a client-server application environment 200. The client-server application environment is shown as including, but not limited to, the components of an application client 210, a server 220 and a database 230. The application client 210 communicates information to the server 220 over communication path A and receives communicated information from the server 220 over communication path B. A protocol such as HTTPS may be used to provide data privacy for information that is communicated between the application client 210 and the server 220 and enforces client authentication to limit access to the server 220 to authorized users. It will be appreciated by one of ordinary skill in the relevant art that the secure data verification technique could be incorporated into any local or distributed computing environment and the illustrated example is just provided for purposes of explanation.

Figure 3:
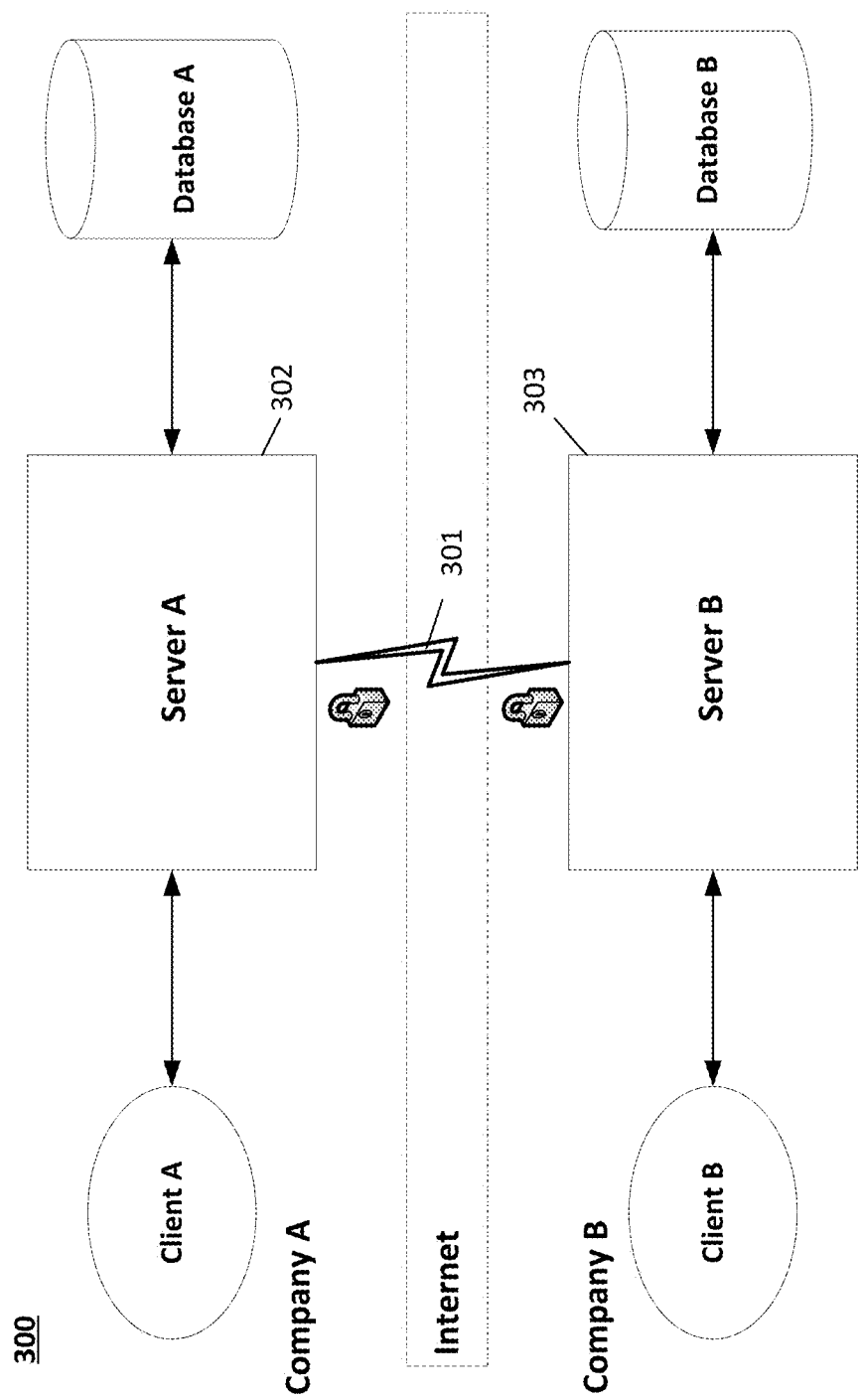
FIG. 3 is a block diagram illustrating the use of a secure communication path between participating entities implementing an exemplary embodiment of the secure data verification technique.

It will be appreciated that the computing platform 200 illustrated in FIG. 2, may then provide an environment on which an application, program, system, etc. can run, and that such application, program, system, etc., may incorporate aspects of the technique or access an external function or system that houses an embodiment of the secure data verification technique. Likewise, the computing platform 100 may also illustrate a platform in which a standalone embodiment of the technique may reside, such as a smart phone, tablet computer, lap top computer, desktop computer, etc. In addition, the computing platform 100 may illustrate a platform in which various components of the system may be implemented. For example, the client 210, the server 220 and the database 230 may each be implemented on a single platform 100 or multiple platforms 100. FIG. 3 is a block diagram illustrating the use of a secure communication path between participating entities implementing an exemplary embodiment of the secure data verification technique. A protocol such as HTTPS can be utilized as a non-limiting example of a secure communication path. HTTPS, which is an acronym for Hypertext Transfer Protocol over SSL, is a protocol utilizing TCP to transfer hypertext requests and information between servers and other servers, and between servers and browsers. The use of this protocol provides encrypted communication and secure identification of a network web server. HTTPS connections are used in many situations in which sensitive information is being communicated. For instance, HTTPS is frequently used for payment transactions on the World Wide Web, as well as other connections in which sensitive information may be communicated. The detailed operation of HTTPS and the involvement between the various communication network layers is not addressed in detail in this description, as those of ordinary skill in the relevant art will be familiar with the technical aspects of HTTPS. As such, only a high-level overview of the technology is presented. HTTPS provides data privacy for information that is communicated between entities utilizing the application being described. For purposes of this description, FIG. 3 illustrates a secure communication path 301 between the Server A 302 of participating entity Company A and the Server B 303 of participating entity Company B.

Use of SSL server authentication allows a user to confirm a server's identity. An application that incorporates SSL-enabled software can use standard techniques of public-key cryptography to check that a server's certificate and public ID are valid and have been issued by a trusted certificate authority. Such confirmation is important—if the servers will be transmitting confidential information over the connection, the identity of the receiver should be validated prior to the transmission of the information.

It should be appreciated that the communication path between the server and client of a given entity (i.e., Server A and Client A) may be secured using HTTPS or other techniques, and that may or may not involve accessing the interne.

It should be appreciated that other techniques can be used to provide the secured transmission of data and client/server communication and authentication, and that the use of HTTPS is only one non-limiting example. For instance, closed networks, closed communication channels, static signing, manual encryption, VPNs, etc. could also be utilized.

Figure 4:
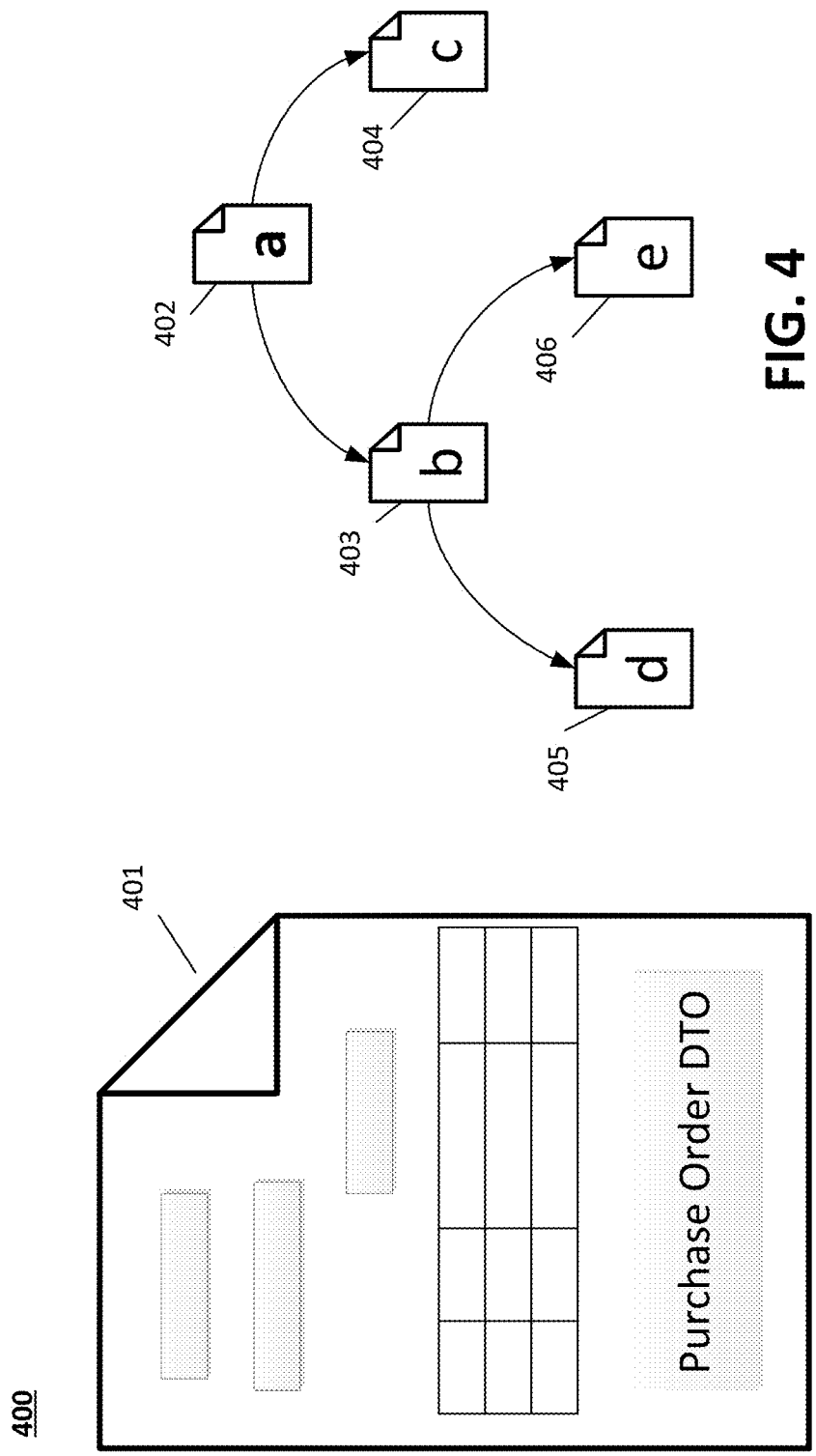
FIG. 4 is a conceptual diagram illustrating exemplary components of an exemplary data object.

FIG. 4 is a conceptual diagram illustrating exemplary components of an exemplary data object. Object-oriented programs are based on the concept of objects that interact with each other, unlike more conventional programming methods that view a program as essentially a list of tasks to be performed. The details of object-oriented programming and the interaction between data objects and other processing functions or routines is not explained here, as those of ordinary skill in the relevant art will be familiar with the technical aspects of object-oriented programming. For the purposes of this application, an object is a self-contained piece of programming code that combines data and the processing instructions needed to manipulate it. If an object also includes the code and processing instructions needed to carry data from one location (or processing step) to another, it can be referred to as a data transfer object. As a non-limiting example, transfer object 401 contains the data relating to a purchase order, the processing instructions needed to manipulate said data, and the processing instructions needed to carry said data from one location (or processing step) to another.

Objects can refer to other objects. As another non-limiting example, transfer object 402 (a) references objects 403 (b) and 404 (c). In turn, object 403 (b) refers to objects 405 (d) and 406 (e). It should be appreciated that objects can reference other objects, regardless of whether or not any of the objects involved are transfer objects. Any or all of the objects 402, 403, 404, 405, and 406 can be a data transfer object. In an exemplary embodiment of the secure data verification technique, data relating to a given business transaction is encapsulated into a transfer object that can be transmitted from the business management system of one participating entity to those of other participating entities.

It should be appreciated that a transfer object is not a remote user connection between participating entities, nor does a transfer object require a remote user connection to be transmitted between participating entities.

Figure 5:
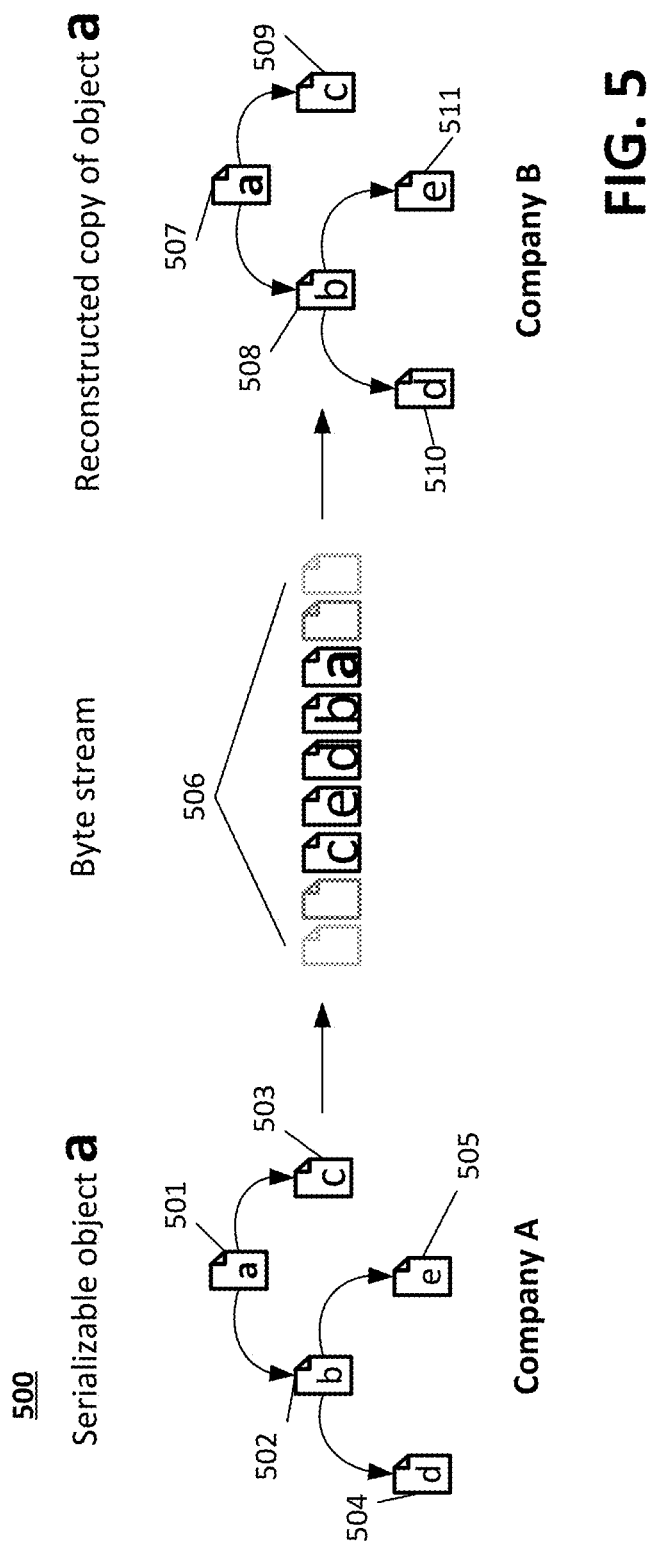
FIG. 5 is a conceptual diagram illustrating the concept of object serialization.

FIG. 5 is a conceptual diagram illustrating the concept of object serialization. More particularly, FIG. 5 depicts the concepts of serializable data transfer objects, the byte streams of serializable data transfer objects, and reconstruction of serializable transfer objects. In an exemplary embodiment of the secure data verification technique, the transfer object of a given business transaction is made serializable so it functions as a link between transfer objects relating to that transaction. A serializable transfer object is converted into a byte stream that preserves the transfer object exactly—the stream includes all the transfer object's data and all references to other objects needed to reconstruct the transfer object at another time, or even another place. As a non-limiting example, serializable transfer object 501 references objects 502 and 503. Object 502, in turn, references objects 504 and 505. transfer object (a) 501, containing all its references is converted into byte stream 506. This allows transfer object (a) 501 to be reconstructed, complete with all its references, at another time or location. transfer object (a) 507 represents a reconstructed copy of transfer object (a) 501. Object (b) 508 corresponds with object 502 (b), object (c) 509 with object (c) 503, object (d) 510 with object (d) 504, and object (e) 511 with object (e) 505.

The descriptions of exemplary embodiments of the secure data verification technique utilize the non-limiting example of a business transaction conducted between two participating entities--Company A and Company B. Company A orders widgets from Company B, which establishes their common accounting link. Both companies use the same business management system and have agreed to use the secure data verification technique to exchange and verify data with each other relevant to their business transactions. As such, each has established a secure communication path utilizing HTTPS and a public/private encryption key system, which provides encrypted communication and secure identification of a network web server.

Figure 6:
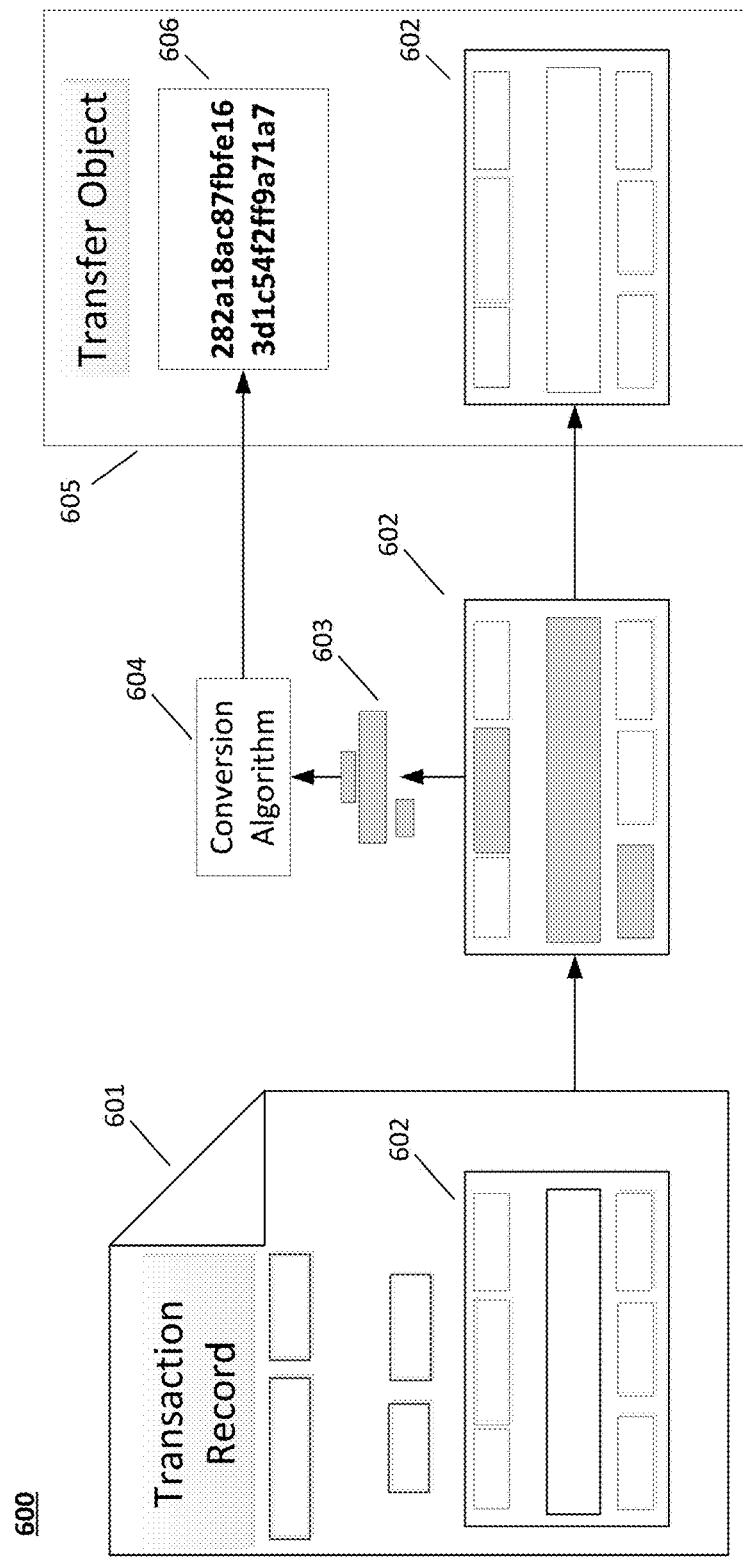
FIG. 6 is a conceptual diagram illustrating a non-limiting example of the manner in which data from an exemplary business transaction is captured, processed, and encapsulated into a serializable data transfer object that will be distributed to the business management systems of participating entities Company A and Company B.

FIG. 6 is a conceptual diagram illustrating a non-limiting example of the manner in which data is captured from an exemplary business transaction, then processed and encapsulated into a serializable data transfer object that will be distributed to the business management systems of participating entities Company A and Company B.

From transaction record 601, data is captured comprising values from predetermined set of fields 602. From the set of copied data 602, the client then copies a subset of the data 603 and transforms it into fixed-size string of data 606 via conversion algorithm 604. The client then encapsulates data string 606 and the set of copied data 602 into serializable data transfer object 605.

Figure 7:
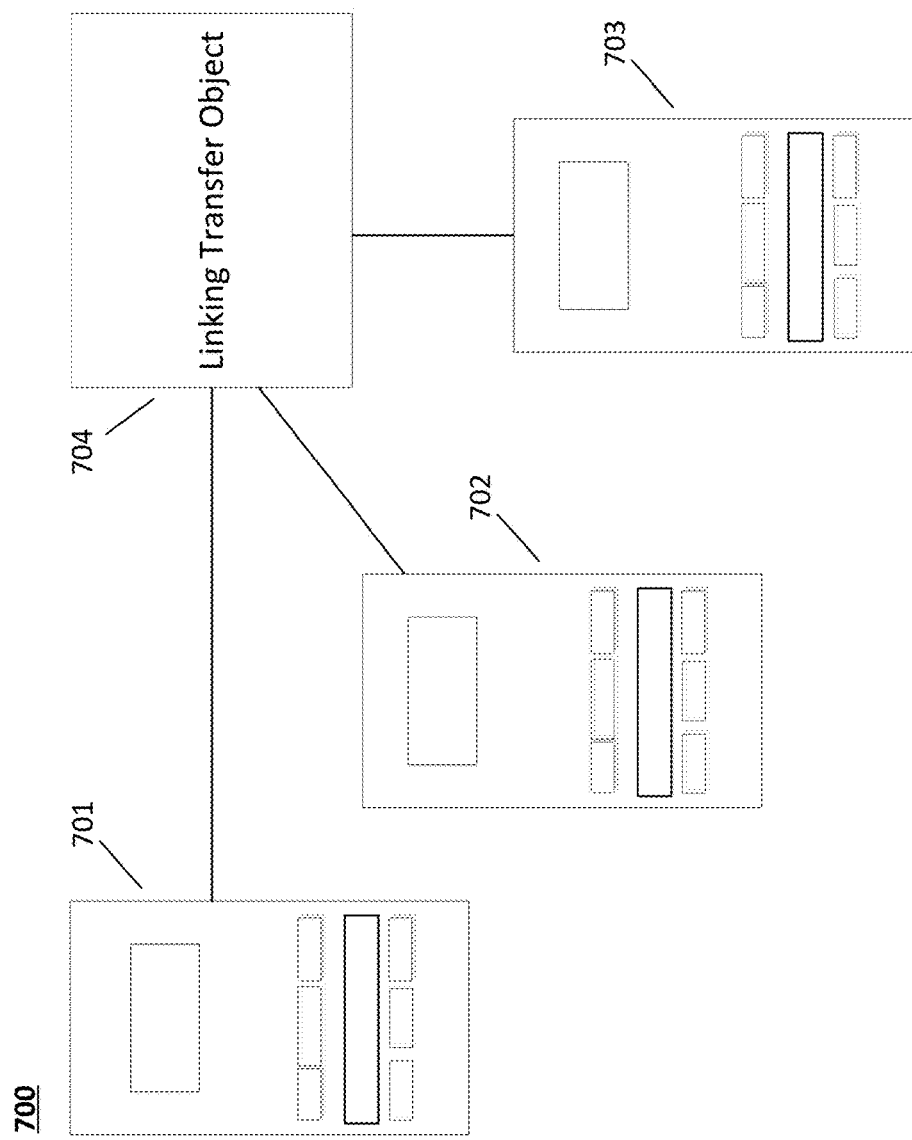
FIG. 7 is a conceptual diagram illustrating a non-limiting example of the linking relationship between transfer objects related to an exemplary transaction between the business management systems of participating entities Company A and Company B.

FIG. 7 is a conceptual diagram illustrating the linking relationship between transfer objects related to an exemplary transaction between the business management systems of participating entities Company A and Company B. Transfer objects 701, 702, and 703 are linked to serializable transfer object 704 that links all transfer objects relating to the transaction.

Figure 8:
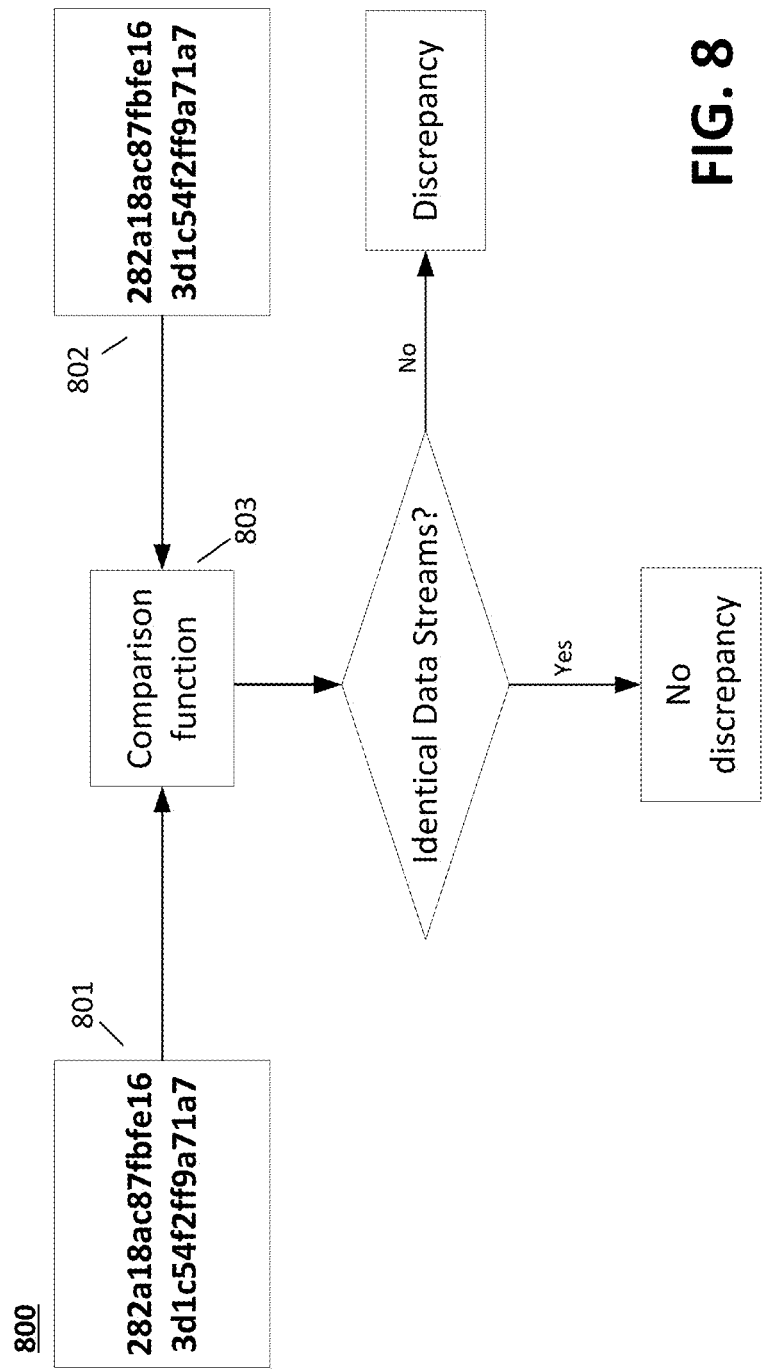
FIG. 8 is a conceptual diagram illustrating a non-limiting example of the process by which two data streams are compared with each other to determine whether a discrepancy exists between the transaction records they represent.

FIG. 8 is a conceptual diagram illustrating the process by which two data streams are compared with each other to determine whether a discrepancy exists between the transaction records they represent. Data streams 801 and 802 are used as input into comparison function 803. If the data strings are identical, no discrepancy exists between the transaction records associated with the data strings being compared. If the data strings are not identical, a discrepancy does exist between the transaction records associated with the data strings being compared.

Figure 9:
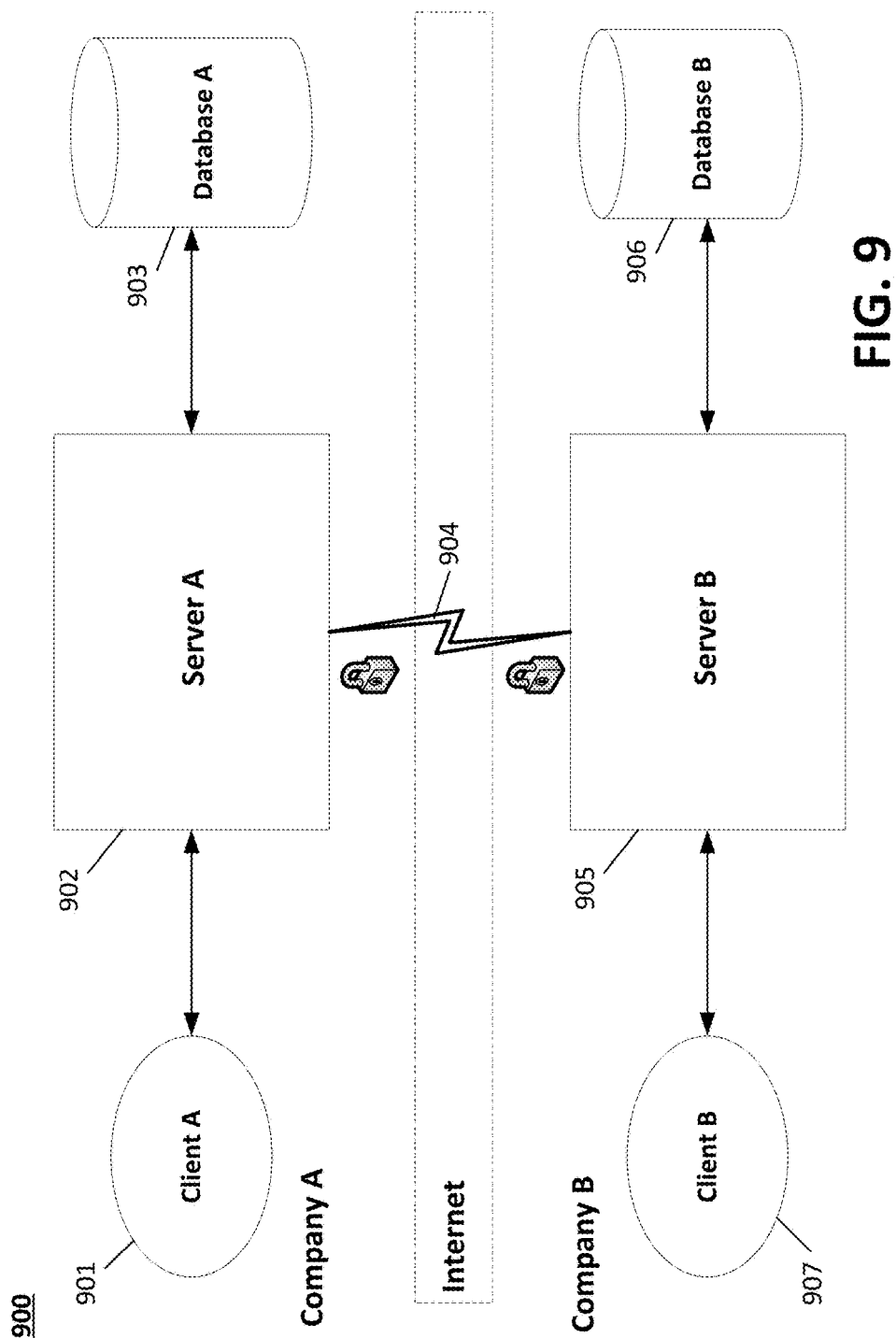
FIG. 9 is a block diagram illustrating a non-limiting example of the business management systems of participating entities Company A and Company B, and the secure communication path between the two entities.

FIG. 9 is a block diagram illustrating a non-limiting example of the business management systems of participating entities Company A and Company B, and the secure communication path between the two entities.

Company A initiates a business transaction by creating a record—for example, a Purchase Order for ten steel widgets—in a client module associated with Client A 901 and transmits it to Server A 902, which saves the record in Database A 903. Client A 901 then captures data comprising values from predetermined fields corresponding to the transaction record. Client A 901 then copies a subset of the captured data and transforms it into a fixed-size string of data via a conversion algorithm. Client A 901 then encapsulates both the data string created by the conversion algorithm and the set of data originally captured from the transaction record into a serializable data transfer object. The transfer object is then linked to another serializable transfer object that links all the transfer objects relating to the transaction. Client A 901 transmits these objects to server A 902, which saves them in Database A 903. The objects are encrypted, then transmitted over secure communication path 904 to Company B's Server B 905, where it is decrypted and saved in Database B 906.

When Company B creates a record relating to the same business transaction—for example, a Sales Order for ten steel widgets—it does so in a client module associated with Client B 907 and transmits it to Server B 905, which saves the record in Database B 906. Client B 907 then captures data comprising values from predetermined fields corresponding to the transaction record. Client B 907 then copies a subset of the captured data and transforms it into a fixed-size string of data via a conversion algorithm. It will be appreciated that the conversion algorithm used by Company B is also used by Company A and all other participating entities. Client B 907 then encapsulates both the data string created by the conversion algorithm and the set of data originally captured from the transaction record into a serializable data transfer object. Client B 907 transmits these objects to server B 905, which saves them in Database B 906. The transfer object is then linked to the serializable transfer object received from Company A that links all the transfer objects relating to the transaction. The objects are encrypted, then transmitted over secure communication path 904 to Company A's Server A 902, where it is decrypted and saved in Database A 903.

When more than one transfer object relating to a given business transaction exists, the two most recent objects are compared to determine if a discrepancy exists between them. Server B 905 compares the transfer object from Company B to the transfer object from Company A by comparing the data streams each object contains. Server A 902 also compares the transfer object from Company B to the transfer object from Company A by comparing the data streams each object contains. It will be appreciated that the comparison function used to compare the data strings from transfer objects is used by all participating entities. If the data streams are identical, the values contained in the records they represent are the same as well, regardless of which participating entity is doing the comparison.

Figure 10:
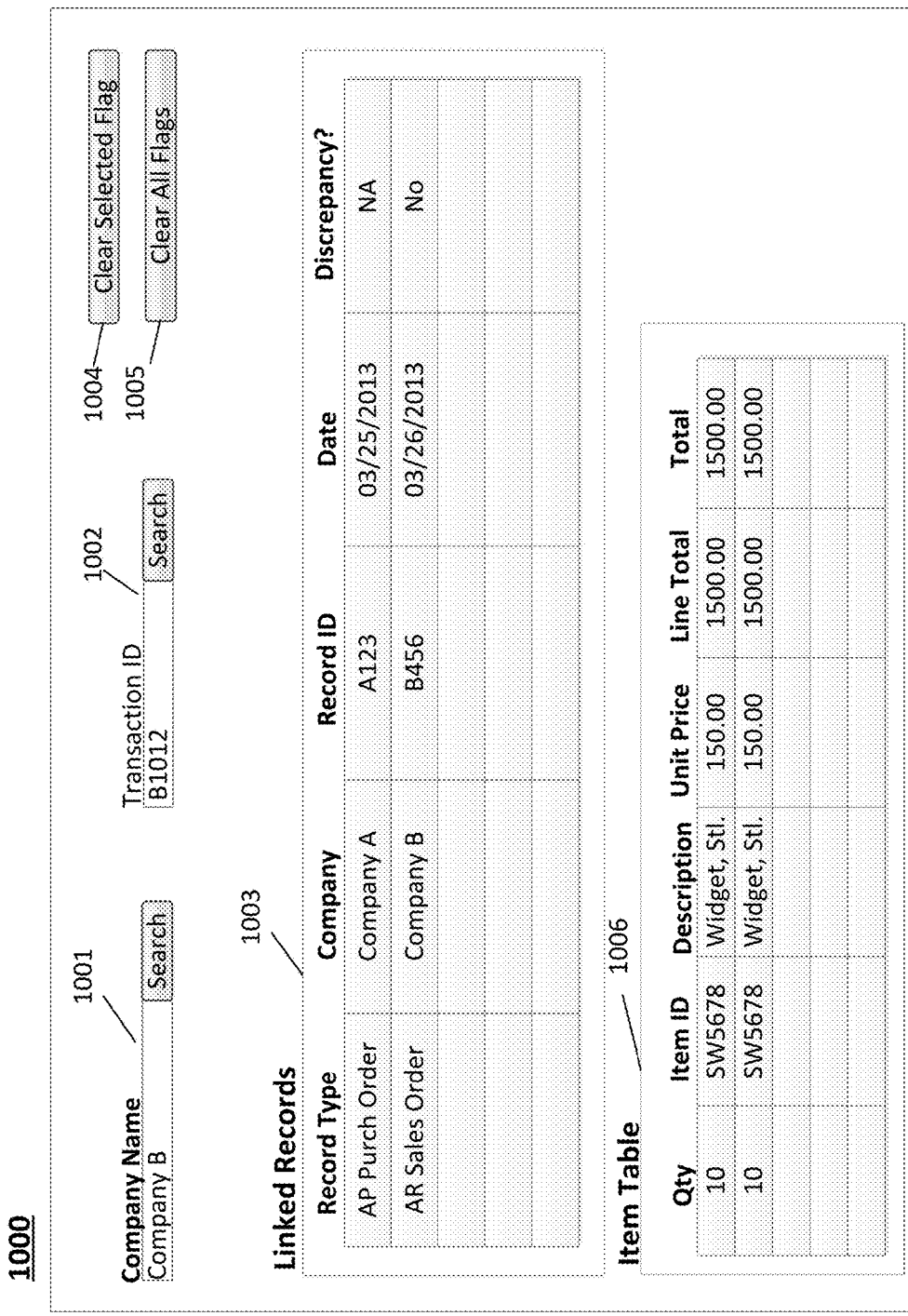
FIG. 10 is an exemplary screen of a conceptual user interface for accessing and managing transfer objects relating to cross-company verification.

FIG. 10 is an exemplary screen of a conceptual user interface for accessing and viewing information contained in transfer objects relating to the secure data verification technique, including discrepancy notifications, or flags. It should be appreciated that this is a non-limiting example of a conceptual user interface, and as such, all elements depicted in this figure are non-limiting examples as well. The exemplary screen includes controls, tables, rows, columns, fields, labels, links, and a variety of other elements; the configuration, placement, grouping, size, arrangement, or combination of elements; and all other concepts or elements depicted in this figure.

The user selects the desired company via Company Name search dialog 1001, and the desired transfer object via transaction search dialog 1002. Alternatively, the user can utilize transfer object search dialog 1002 without using a Company Name search dialog 1001, since each transaction will typically have a unique identifier.

Once a transaction is selected, a list of the records comprising it displays in Linked Records table 1003. Each row contains information for one record, along with the record's discrepancy status. A record can be selected by clicking on its corresponding row in the table. The contents of the selected record's item table display in Item Table 1006. The discrepancy flag for a selected record can be cleared by clicking Clear Selected Flag button 1004. All discrepancy flags for the transaction can be cleared by clicking Clear All Flags button 1005.

What is claimed is:

1. A method of verifying electronic data between a first entity and a second entity, the first entity and the second entity utilizing a compatible business management system, the method comprising the acts of:
    the first entity creating and saving data related to a first transaction into a business management system of the first entity;
    the business management system of the first entity configured to:
        capture a portion of the data related to the first transaction;
        copy a subset of the captured portion of data;
        transform the subset of the captured portion of data into a fixed-sized string of data using a conversion algorithm;
        encapsulate the captured portion of data and the fixed-sized string of data produced by the conversion algorithm into a serializable data transfer object of the first entity;
        link the serializable data transfer object of the first entity to a linking serializable data transfer object that links all the serializable data transfer objects related to the transaction;
        electronically transfer the serializable data transfer objects to a business management system of the second entity, wherein the first entity and the second entity have a common accounting link and wherein the linking serializable data transfer object shares the common accounting link with the business management system of the first entity and the second entity;
    the business management system of the second entity configured to:
        receive the serializable data transfer object of the first entity that contains the captured portion of the data and the fixed-sized string of data produced by the conversion algorithm related to the transaction;
        receive the linking serializable data transfer object that links all the serializable data transfer objects related to the transaction;
        incorporate both serializable data transfer objects received from the first entity into the business management system of the second entity;
        create and save data related to a second transaction between the first entity and the second entity into a business management system;
        capture a portion of the data related to the second transaction;
        copy a subset of the captured portion of data;
        transform the subset of the captured data into a fixed-sized string of data using a conversion algorithm;
        encapsulate the captured portion of data and the fixed-sized string of data produced by the conversion algorithm into a serializable data transfer object of the second entity;
        access the fixed-sized string of data encapsulated in the serializable data transfer object of the first entity;
        compare the fixed-sized string of data in the serializable data transfer object of the first entity to the fixed-sized data string in the serializable data transfer object of the second entity;
        identify whether a discrepancy exists between the fixed-sized strings of data being compared;
        link the serializable data transfer object of the second entity to the linking serializable data transfer object;
    the business management system of the second entity transferring at least the serializable data transfer object of the second entity to the business management system of the first entity;
    the business management system of the first entity further configured to:
        receive the serializable data transfer object of the second entity;
        receive the linking serializable data transfer object;
        incorporate the serializable data transfer objects received from the second entity into the business management system of the first entity;
        access the fixed-sized string of data encapsulated in the serializable data transfer object of the second entity;
        compare the fixed-sized string of data in the serializable data transfer object of the second entity to the data string in the serializable data transfer object of the first entity;
        identify whether a discrepancy exists between the data strings being compared; and
    restricting access to data comprising associated transaction records, within the serializable data transfer objects of the first entity and the second entities to only originating entities.

2. The method of claim 1, further comprising the actions of:
    the business management system of either the first or second entity being configured to:
        receive data for the creation of subsequent serializable data transfer objects; and
    electronically transferring said subsequent serializable data transfer objects to the business management system of the other entity.

3. The method of claim 1, wherein the data encapsulated into the serializable data transfer objects exchanged between the entities comprise a subset of data that can be organized into discrete records that document a business transaction.

4. The method of claim 1, wherein more than two entities can be participating entities and the serializable data transfer objects comprise a transaction record that is related by a business relationship to a plurality of the participating entities, or to each of the participating entities.

5. The method of claim 1, wherein the types of data exchanged in the serializable data transfer objects can be mutually agreed upon by the entities.

6. The method of claim 1, wherein more than two entities can be participating entities and the data exchanged between the entities can comprise a subset of the data pertaining to a plurality of the participating entities, or to each of the participating entities.

7. The method of claim 1, wherein the conversion algorithm utilized by the participating entities is the same hashing algorithm.

8. The method of claim 1, wherein the subset of data transformed by the conversion algorithm utilized by the participating entities is the same for each record relating to the transaction.

9. The method of claim 1, wherein the data encapsulated in the serializable data transfer objects is secured by encryption before transfer.

10. The method of claim 1, wherein the ability to encrypt and decrypt the serializable data transfer objects is available only to the entities exchanging the serializable data transfer objects.

11. An application running on a computer systems comprising a processor and memory, and operating to securely exchange and verify electronic data between multiple entities that use the same business management system, the application configured to:
create and save, on a database corresponding to a first participating entity, data related to transaction records from participating entities via a processor, the database stored on a memory, the processor communicatively linked to the database;
capture a portion of said data;
copy a subset of the captured data, and store the subset into the database corresponding to the first participating entity;
transform a subset of the captured data into a fixed-sized string of data;
encapsulate the captured data and the fixed-sized string of data into serializable data transfer objects;
link said serializable data transfer objects to other serializable data transfer objects;
encrypt the data contained in the serializable data transfer objects;
electronically transfer the serializable data transfer objects to other participating entities;
receive one ore more other serializable data transfer objects transferred from other participating entities;
decrypt the one or more other serializable data transfer objects;
access the data encapsulated in the one or more other serializable data transfer objects;
compare fixed-sized data strings contained in the serializable data transfer objects and the one ore more other serializable data transfer objects;
identify discrepancies between the fixed-sized data strings being compared;
link all serializable data transfer objects and all one ore more other serializable data transfer objects relating to the transaction records from all participating entities;
encrypt the data contained in said linked serializable data transfer objects;
electronically transfer the linked serializable data transfer objects to other participating entities;
receive modified serializable data transfer objects from other participating entities; and
restrict access to data comprising associated transaction records within the serializable data transfer objects to only originating entities;
wherein the first participating entity and other participating entities have a common business data link and wherein the linked serializable data transfer object shares the common business data link with the business management system of the first participating entity and the other participating entities.

12. A system for securely exchanging and verifying electronic data between multiple entities that use the same business management system, the system comprising:
a memory element;
a source interface to one or more sources;
a user interface; and
a processor communicatively coupled to the memory element, the source interface and the user interface, the processor, in response to executing program instructions contained in the memory element, being configured to:
create and save data relating to a transaction between participating entities;
capture a portion of said data;
copy a subset of the captured data;
transform a subset of the captured data into a fixed-sized string of data;
encapsulate the captured data and the fixed-sized string of data into serializable data transfer objects;
link the serializable data transfer objects to other serializable data transfer objects;
encrypt the data contained in the serializable data transfer objects;
electronically transfer the serializable data transfer objects to other participating entities;
receive the one or more other serializable data transfer objects transferred from other participating entities;
decrypt the one or more other serializable data transfer objects;
access the data contained in the one or more other serializable data transfer objects;
compare fixed-sized data strings contained in the serializable data transfer objects and the one or more other serializable data transfer objects;
identify discrepancies between the data strings being compared;
display data contained in the serializable data transfer objects; and
restrict access to data comprising associated transaction records within the serializable data transfer objects to only originating entities;
wherein the linked serializable data transfer object shares a common business data link with the business management system of the first participating entity and the other participating entities.

* * * * *